United States Patent
Castello et al.

(10) Patent No.: US 11,486,229 B2
(45) Date of Patent: Nov. 1, 2022

(54) COOLING FLUID CIRCULATION SYSTEMS FOR OFFSHORE PRODUCTION OPERATIONS

(71) Applicant: HORTON DO BRASIL TECNOLOGIA OFFSHORE, LTDA., Rio de Janeiro (BR)

(72) Inventors: Xavier Castello, Rio Grande (BR); Marcelo I. L. Souza, Rio de Janeiro (BR); Rodrigo M. R. Guimarães, Rio de Janeiro (BR); Luiz Germano Bodanese, Rio de Janeiro (BR); Rafael Bodanese, Macaé (BR)

(73) Assignee: HORTON DO BRASIL TECNOLOGIA OFFSHORE LTDA., Rio de Janeiro (BR)

( * ) Notice: Subject to any disclaimer, the term of this patent is extended or adjusted under 35 U.S.C. 154(b) by 280 days.

(21) Appl. No.: 16/754,495

(22) PCT Filed: Oct. 9, 2018

(86) PCT No.: PCT/BR2018/050371
§ 371 (c)(1),
(2) Date: Apr. 8, 2020

(87) PCT Pub. No.: WO2019/071329
PCT Pub. Date: Apr. 18, 2019

(65) Prior Publication Data
US 2020/0392813 A1    Dec. 17, 2020

Related U.S. Application Data

(60) Provisional application No. 62/570,080, filed on Oct. 9, 2017.

(51) Int. Cl.
*F24T 10/15*        (2018.01)
*E21B 17/01*        (2006.01)
(Continued)

(52) U.S. Cl.
CPC .......... *E21B 36/001* (2013.01); *E21B 17/012* (2013.01); *E21B 17/085* (2013.01); *F24T 10/15* (2018.05); *F24T 2010/56* (2018.05)

(58) Field of Classification Search
None
See application file for complete search history.

(56) References Cited

U.S. PATENT DOCUMENTS

| 4,357,989 A | 11/1982 | Holzle |
| 5,505,426 A * | 4/1996 | Whitby ................. E21B 33/063 |
| | | 251/1.3 |

(Continued)

FOREIGN PATENT DOCUMENTS

| WO | 2003/104605 A1 | 12/2003 | |
| WO | WO-2010085302 A2 * | 7/2010 | ............. B63B 13/00 |

OTHER PUBLICATIONS

PCT/BR2018/050371 International Search Report and Written Opinion dated May 8, 2019 (11 p.).

(Continued)

*Primary Examiner* — Matthew Troutman
*Assistant Examiner* — Douglas S Wood
(74) *Attorney, Agent, or Firm* — Conley Rose, P.C.

(57) ABSTRACT

Offshore production systems and methods relating thereto are disclosed. In an embodiment, the offshore production system includes a surface vessel. In addition, the offshore production system includes a closed-loop cooling fluid circulation system extending subsea from the vessel and configured to cool a cooling fluid. The closed-loop cooling fluid circulation system includes a first tendon having an upper end coupled to the surface vessel and a lower end coupled to the seabed. The first tendon is in tension between the upper end and the lower end. The first tendon is configured (Continued)

to flow the cooling fluid from the lower end of the first tendon to the upper end of the first tendon.

15 Claims, 14 Drawing Sheets

(51) Int. Cl.
   *E21B 36/00* (2006.01)
   *E21B 17/08* (2006.01)
   *F24T 10/00* (2018.01)

(56) References Cited

U.S. PATENT DOCUMENTS

| | | | |
|---|---|---|---|
| 6,142,215 | A | 11/2000 | Paulsen et al. |
| 6,837,311 | B1 | 1/2005 | Sele et al. |
| 7,159,662 | B2* | 1/2007 | Johansen ............... E21B 34/16 166/374 |
| 8,176,971 | B2 | 5/2012 | McClung |
| 8,978,769 | B2 | 3/2015 | Moore |
| 9,022,128 | B2* | 5/2015 | Efthymiou ............ F25J 1/0022 166/367 |
| 2008/0016894 | A1 | 1/2008 | Wiggs |
| 2008/0148758 | A1 | 6/2008 | Kidwell et al. |
| 2012/0125561 | A1 | 5/2012 | Levings et al. |
| 2012/0285656 | A1* | 11/2012 | Moore ................ E21B 36/001 165/45 |
| 2013/0269947 | A1 | 10/2013 | Shilling et al. |
| 2013/0283919 | A1* | 10/2013 | Coonrod ................ E21B 33/06 73/632 |
| 2014/0262138 | A1 | 9/2014 | Oney |
| 2015/0000925 | A1 | 1/2015 | Benard et al. |
| 2016/0084031 | A1* | 3/2016 | DeOcampo ........... E21B 33/062 166/84.1 |
| 2016/0258553 | A1 | 9/2016 | Zhang et al. |
| 2017/0362929 | A1* | 12/2017 | Leach .................... E21B 33/06 |
| 2018/0347304 | A1* | 12/2018 | Alalasundaram ... F16K 31/1225 |
| 2019/0003275 | A1* | 1/2019 | Deul .................... E21B 33/062 |
| 2020/0284274 | A1* | 9/2020 | van Kuilenburg .. F15B 15/2815 |

OTHER PUBLICATIONS

PCT/BR2018/050371 Article 19 Amendments filed Jul. 8, 2019 (15 p.).

* cited by examiner

COOLING FLUID CIRCULATION SYSTEMS FOR OFFSHORE PRODUCTION OPERATIONS

CROSS-REFERENCE TO RELATED APPLICATIONS

This application is a 35 U.S.C. § 371 national stage application of PCT/BR2018/050371 filed Oct. 9, 2018 and entitled "Cooling Fluid Circulation Systems for Offshore Production Operations," which claims benefit of U.S. provisional patent application Ser. No. 62/570,080 filed Oct. 9, 2017, and entitled "Closing Fluid Circulation Systems for Offshore Production Operations," each of which is hereby incorporated herein by reference in its entirety for all purposes.

STATEMENT REGARDING FEDERALLY SPONSORED RESEARCH OR DEVELOPMENT

Not applicable.

BACKGROUND

Field of the Disclosure

The disclosure relates generally to offshore production systems. More particularly, the disclosure relates to systems and methods for cooling a cooling fluid or coolant used to receive thermal energy from one or more process fluids employed in production operations.

Background to the Disclosure

Offshore production systems often have large and complex processing plants to assist in various production operations. For example, processing plants on the deck or topsides of an offshore production vessel are often used to separate oil from production fluids that may also include water and gas, to treat the produced fluids (e.g., the oil, water, and gas), to pump and compress fluids, to generate power for operating the offshore structure, etc. Heat exchangers are largely used to cool the processing plants relying on closed circuits of cooling water that are in turn cooled by seawater. In many cases, the seawater is obtained from the sea, and more particularly from a region of the sea that is relatively close to the surface, where the sea water typically has a temperature of about 20° C. This seawater receives thermal energy from the closed circuits of cooling water having temperatures of about 60° C.

SUMMARY

Embodiments of offshore production systems are disclosed herein. In one embodiment, an offshore production system comprises a surface vessel. In addition, the offshore production system comprises a closed-loop cooling fluid circulation system extending subsea from the vessel and configured to cool a cooling fluid. The closed-loop cooling fluid circulation system comprises a first tendon having an upper end coupled to the surface vessel and a lower end coupled to the seabed. The first tendon is in tension between the upper end and the lower end. The first tendon is configured to flow the cooling fluid from the lower end of the first tendon to the upper end of the first tendon.

Embodiments of systems for circulating and cooling a cooling fluid for receiving thermal energy from a process fluid are also disclosed herein. In one embodiment, the system comprises a tendon extending subsea from an offshore vessel, the tendon having an upper end coupled to the offshore vessel and a lower end coupled to the seabed. In addition, the system comprises a plurality of circumferentially-spaced conduits disposed about the tendon. Each conduit extends subsea from the offshore vessel. Each conduit has an upper end coupled to the offshore vessel and a lower end coupled to the sea bed. The lower end of each conduit is in fluid communication with the lower end of the tendon. Still further, the system comprises a plurality of vertically spaced hubs coupling the conduits to the tendon. The hubs are configured to maintain a radial spacing between the tendon and the conduits. The conduits are configured to flow the cooling fluid from the offshore vessel and the tendon is configured to flow the cooling fluid to the offshore vessel.

Embodiments of methods for cooling a process fluid on an offshore vessel are also disclosed herein. In one embodiment, the method comprises (a) flowing a cooling fluid from a heat exchanger on the offshore vessel down a plurality of conduits extending subsea from the vessel. Each conduit has an upper end coupled to the offshore vessel and a lower end proximal the seabed. In addition, the method comprises (b) flowing the cooling fluid from the lower ends of the conduits into a lower end of a tendon. The tendon has a lower end proximal the seabed and an upper end coupled to the offshore vessel. Further, the method comprises (c) applying tension to the tendon during (a) and (b). Still further, the method comprises (d) transferring thermal energy from the cooling fluid to the surrounding water during (a) and (b).

Embodiments described herein comprise a combination of features and advantages intended to address various shortcomings associated with certain prior devices, systems, and methods. The foregoing has outlined rather broadly the features and technical advantages of the invention in order that the detailed description of the invention that follows may be better understood. The various characteristics described above, as well as other features, will be readily apparent to those skilled in the art upon reading the following detailed description, and by referring to the accompanying drawings. It should be appreciated by those skilled in the art that the conception and the specific embodiments disclosed may be readily utilized as a basis for modifying or designing other structures for carrying out the same purposes of the invention. It should also be realized by those skilled in the art that such equivalent constructions do not depart from the spirit and scope of the invention as set forth in the appended claims.

BRIEF DESCRIPTION OF THE DRAWINGS

For a detailed description of the preferred embodiments, reference will now be made to the accompanying drawings, wherein.

DETAILED DESCRIPTION OF EXEMPLARY EMBODIMENTS

Figure 1:
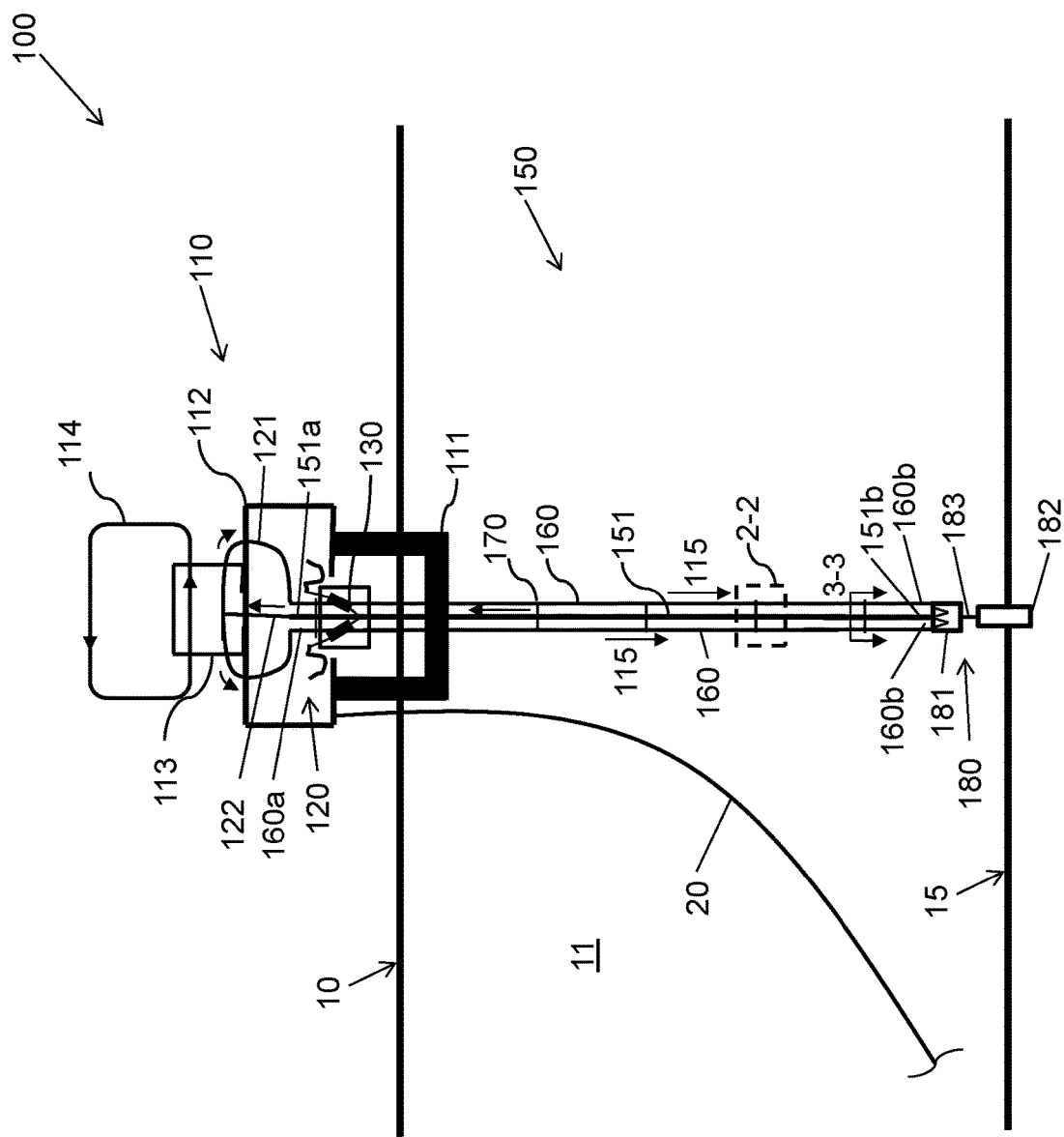
FIG. 1 is a schematic view of an embodiment of an offshore production system in accordance with principles disclosed herein.

The following discussion is directed to various exemplary embodiments. However, one of ordinary skill in the art will understand that the examples disclosed herein have broad application, and that the discussion of any embodiment is meant only to be exemplary of that embodiment, and not intended to suggest that the scope of the disclosure, including the claims, is limited to that embodiment.

Certain terms are used throughout the following description and claim to refer to particular features or components. As one skilled in the art will appreciate, different persons may refer to the same feature or component by different names. This document does not intend to distinguish between components or features that differ in name but not function. The drawing figures are not necessarily to scale. Certain features and components herein may be shown exaggerated in scale or in somewhat schematic form and some details of conventional elements may not be shown in interest of clarity and conciseness.

In the following discussion and in the claims, the terms "including" and "comprising" are used in an open-ended fashion, and thus should be interpreted to mean "including, but not limited to . . . ." Also, the term "couple" or "couples" is intended to mean either an indirect or direct connection. Thus, if a first device couples to a second device, that connection may be through a direct connection of the two devices, or through an indirect connection that is established via other devices, components, nodes, and connections. In addition, as used herein, the terms "axial" and "axially" generally mean along or parallel to a given axis (e.g., central axis of a body or a port), while the terms "radial" and "radially" generally mean perpendicular to the given axis. For instance, an axial distance refers to a distance measured along or parallel to the central axis, and a radial distance means a distance measured perpendicular to the central axis.

As previously described, offshore production platforms incorporate various and complex processing plants for performing operations in support of production such as oil and gas processing, liquefaction of gases, power generation, etc. The processing plants are often cooled with closed circuits of cooling water, which are in turn cooled with seawater. The seawater, which often has a temperature of about 20° C., is used to cool the closed circuits of cooling water, which may have temperatures of about 60° C. One problem with this conventional approach for cooling processing plants is that the seawater obtained from close to the sea surface has elevated concentrations of oxygen and salt, so that heat exchangers made of relatively expensive and heavy metal alloys (e.g., titanium alloys) may be employed to ensure extended use thereof. In addition, there is a relatively small temperature differential between the seawater taken from at or near the sea surface and the water within the closed circuits, and there are environmental limitations on the temperature of water that is discarded back to the sea (typically 40° C.). Thus, there is typically a relatively large volumetric flow rate of seawater within these systems, which may occupy large topside space and weight.

Accordingly, embodiments described herein are directed to offshore production systems and cooling systems for offshore production operations that employ closed loops to circulate cooling water between the offshore vessel and seabed. Circulation of the water to depths well below the surface offers the potential for increased temperature differentials between the cooling fluids, which provide enhanced cooling and cooling efficiency. In addition, the use of closed loops, which do not discard cooling water into the sea, reduce and/or eliminate the burdens imposed by the above described environmental limitations (which may thereby result in reduced flow rates, reduced topsides weight, etc.). Further, use of closed loops of water as opposed to near-surface seawater (which has a high salt and oxygen concentrations as previously described) may reduce the engineering requirements and associated costs of the heat exchangers employed within the disclosed embodiments.

Referring now to FIG. 1, an embodiment of an offshore production system 100 is shown. In general, system 100 produces hydrocarbons (e.g., oil and/or gas) from a subterranean formation (not shown) disposed beneath the seabed 15. Production system 100 includes a floating offshore structure or platform 110 disposed at a surface or waterline 10 of the sea 11, a heat exchanger 113, and a closed-loop cooling fluid circulation system 150. In this embodiment, platform 110 is a floating offshore structure, and in particular, a semi-submersible platform including a ballast adjustable, buoyant hull 111 that supports deck or topsides 112 above the waterline 10 of the sea 11. Although offshore platform 110 is a floating semi-submersible platform in this embodiment, in other embodiments, the offshore structure (e.g., platform 110) may comprise a drillship, tension-leg platform, a spar platform, a bottom founded platform (e.g., jackup rig), or other types of known offshore structures. A production riser 20 supplies production fluids to platform 110. In general, production riser 20 can supply production fluids from any subsea source such as a subsea production manifold, a subsea well, a subsea pipeline, or the like. Heat exchanger 113 is supported on the topsides 112 of platform 110, and cooling fluid circulation system 150 extends from the heat exchanger 113 to the seabed 15.

Referring still to FIG. 1, heat exchanger 113 transfers thermal energy from a process fluid 114 used in operations on topsides 112 to a cooling fluid or coolant 115 circulated through system 150. As will be described in more detail below, the coolant 115 receives thermal energy from the process fluid 114 at heat exchanger 113, and transfers thermal energy to the surrounding sea 11 with system 150.

In general, the process fluid 114 can be any fluid used in support of offshore operations, such operations including, for example, separation or treatment of production fluids, pumping or compression of fluids, generation of power, etc. In addition, the cooling fluid 115 can be any suitable coolant for use in offshore operations. In embodiments described herein, coolant 115 is fresh water, which may contain additives to enhance its heat transfer properties, reduce its corrosiveness, etc.

Referring still to FIG. 1, in this embodiment, closed-loop cooling fluid circulation system 150 includes a central tubular conduit 151, a plurality of outer tubular conduits 160 disposed about conduit 151, a first or upper connection system 120 coupling conduit 151 and conduits 160 to platform 110, and a second or lower connection system 180 coupling conduit 151 and conduits 160 to the seabed 15. In particular, central conduit 151 has a first or upper end 151a coupled to topsides 112 with upper connection system 120 and a second or lower end 151b coupled to seabed 15 with lower connection system 180. Similarly, each conduit 160 has a first or upper end 160a coupled to topside 112 with upper connection system 120 and a second or lower end 160b coupled to seabed 15 with lower connection system 180. As will be described in more detail below, a top tensioner 130 extending from platform 110 to conduit 151 proximal its upper end 151a places and maintains tension on conduit 151. Accordingly, central conduit 151 may also be referred to herein as a "tendon" or "top tensioned riser."

Figure 2:
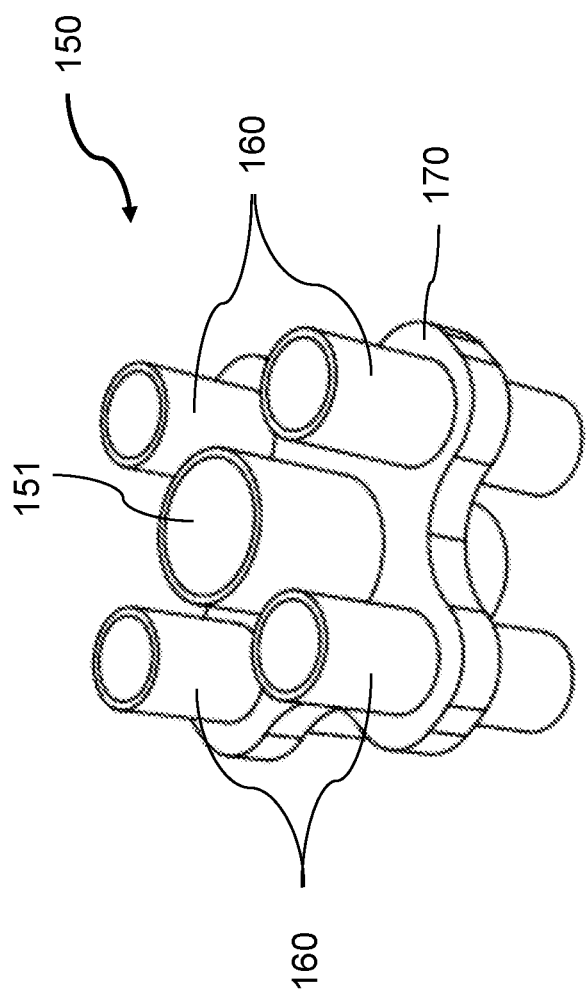
FIG. 2 is an enlarged partial perspective view of the tubular tendon, conduits, and one hub of FIG. 1 taken along section 2-2 of FIG. 1.
Figure 3:
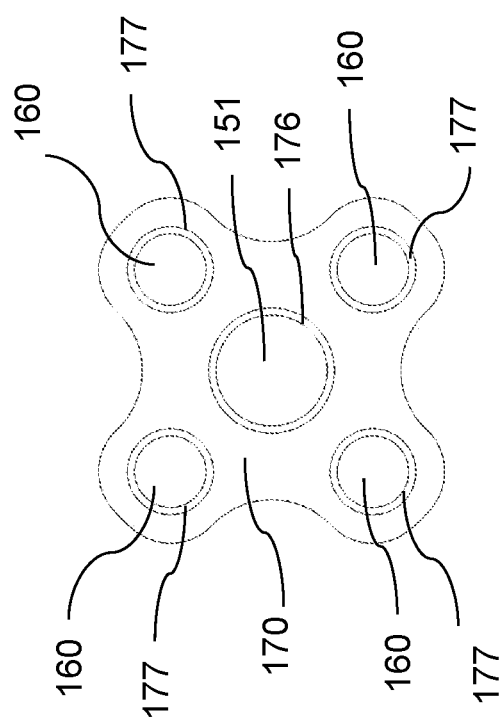
FIG. 3 is a top view of the tubular tendon, conduits, and hub of FIG. 2.

Referring now to FIGS. 1-3, conduits 151, 160 are oriented parallel to each other with outer conduits 160 circumferentially-spaced about central conduit 151 and radially spaced from central conduit 151. The positioning and spacing of conduits 151, 160 is maintained by a plurality of vertically-spaced guides or hubs 170. In this embodiment, each hub 170 is a plate including a central through hole 176 sized to receive central conduit 151 and a plurality of circumferentially-spaced outer through holes 177 sized to receive conduits 160. Holes 177 are uniformly radially spaced from central hole 176. In this embodiment, each hub 170 is fixably attached to each conduit 151, 160 that passes therethrough (e.g., by welding). In addition, in this embodiment, central conduit 151 is generally supported and placed in tension by top tensioner 130, whereas outer conduits 161 are supported by tendon 151 via hubs 170. To reduce the loads supported by tensioner 130 and the loads applied to tendon 151 by hubs 170, buoyancy modules may be attached to conduits 160, tendon 150, hubs 170, or combinations thereof. In addition, since tendon 151 supports at least some of the weight of conduits 160, tendon 151 may be designed with increased mechanical strength and integrity as compared to conduits 160.

As previously described, in this embodiment, each hub 170 is fixably attached to each conduit 151, 160 by welding. However, in other embodiments, the conduits (e.g., conduits 151, 160) are fixably attached to each hub 170 by other suitable means. For example, in one embodiment, each conduit is threadably coupled to each hub 170. In still other embodiments, each hub 170 is fixably attached to the central conduit, however, each outer conduit is not fixably attached to each hub 170. For example, in one embodiment, the outer conduits slidingly engage select hubs and are fixably attached to other hubs (e.g., the uppermost and/or lowermost hubs) such that the central conduit still supports the load of the outer conduits. In such embodiments, the hubs 170 are installed with the central conduit first, then the conduits are lowered through the hubs 170 and fixably attached to select hubs.

As will be described in more detail below, outer conduits 160 flow the relatively hot cooling fluid 115 exiting heat exchanger 113 from platform 110 to lower ends 160b at or proximal the seabed 15, the cooling fluid 115 flows from lower ends 160b of conduits 160 into lower end 151b of tendon 151, and tendon 151 flows the relatively cold cooling fluid 115 from lower end 151b to platform 110 where it is supplied to heat exchanger 113. Thus, central tendon 151 receives the cooling fluid 115 from all of the outer conduits 160. Accordingly, in this embodiment, the inner diameter of central tendon 151 is larger than the inner diameter of each outer conduit 161.

Figure 4:
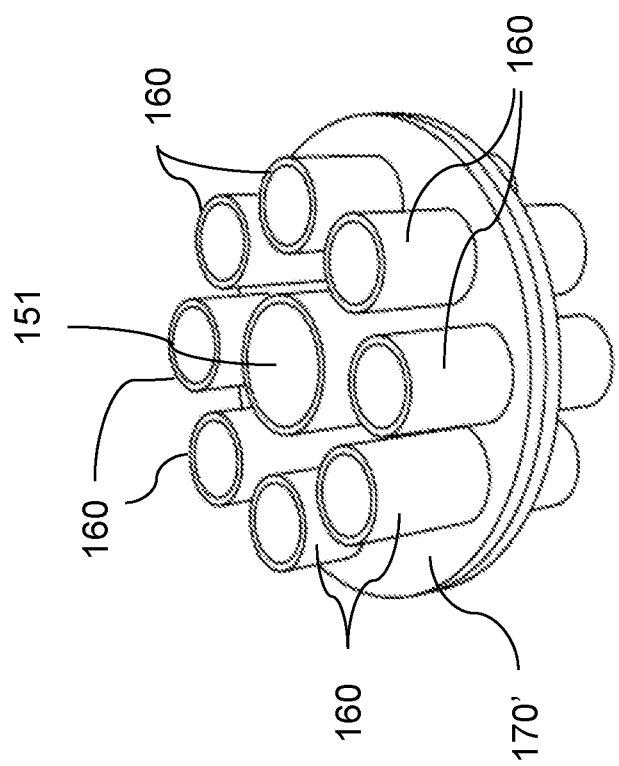
FIG. 4 is an enlarged partial perspective view of an alternate arrangement of a tubular tendon, a plurality of conduits, and a hub.
Figure 5:
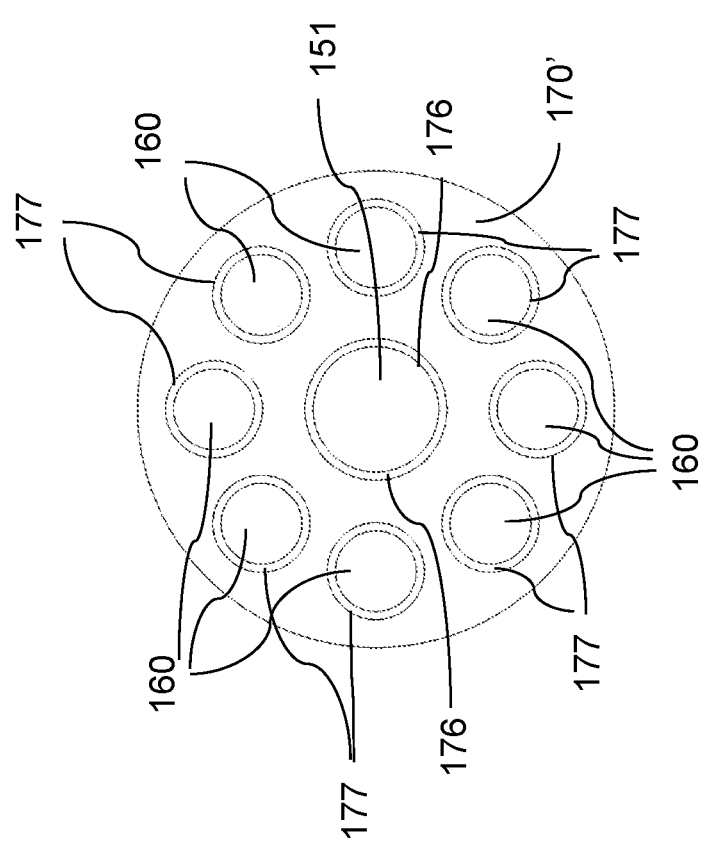
FIG. 5 is a top view of the tubular tendon, conduits, and hub of FIG. 4.

In this embodiment, four outer conduits 160 are provided, and thus, each hub 170 includes four uniformly circumferentially-spaced holes 177 disposed about central hole 176. However, in other embodiments, the number and arrangement of outer conduits (e.g., conduits 160) can be varied. For example, FIGS. 4 and 5 illustrate a partial view of a plurality of outer conduits 160 disposed about a central tendon 151 of another embodiment of a closed-loop cooling fluid circulation system. In this embodiment, eight outer conduits 160 are disposed about central tendon 151, and thus, each hub 170' includes eight uniformly circumferentially-spaced holes 177 disposed about central hole 176. In general, the number and inner diameters of the outer conduits 160 can be selected to achieve the desired heat exchange and temperature drop, wherein for the same fluid flux, a large number of radial conduits of smaller diameter will result in larger temperature drop and larger pressure drop.

Referring again to FIG. 1, lower connection system 180 includes a terminal block 181, an anchor 182, and a flexible joint 183 extending from block 181 to anchor 182. Lower ends 151b, 160b are fixably secured to terminal block 181. In addition, terminal block 181 includes a plurality of U-shaped flow passages extending from lower ends 160b to lower end 151b. Thus, terminal block 181 mechanically couples lower ends 151b, 160b and provides fluid communication between each lower end 160b and lower end 151b. Anchor 182 is fixably secured to the seabed 15 and maintains the position of terminal block 181, and hence lower ends 151b, 160b, proximal the seabed 15. Thus, anchor 182 resists the upward force applied thereto by the tension in tendon 151. In this embodiment, anchor 182 is a suction pile. However, in general, anchor 182 can be any suitable anchor known in the art such as a driven pile, suction can, gravity anchor, or the like. Joint 183 couples terminal block 181 to anchor 182 and allows limited lateral movement of terminal block 181 relative to anchor 182 to accommodate movement of platform 110 at the surface 10. In this embodiment, joint 183 is a flex joint, however, in other embodiments, joint 183 can be a stress joint.

Referring still to FIG. 1, in this embodiment, the upper connection system 120 includes a plurality of jumpers 121, a jumper 122, and top tensioner 130. Each jumper 121 extends from heat exchanger 113 to upper end 160a of one of the outer conduits 160, and jumper 122 extends from heat exchanger 113 to upper end 151a of central tendon 151. Thus, jumpers 121 provide fluid communication between heat exchanger 113 and conduits 160, and jumper 121 provides fluid communication between heat exchanger 113 and tendon 151.

Figure 6:
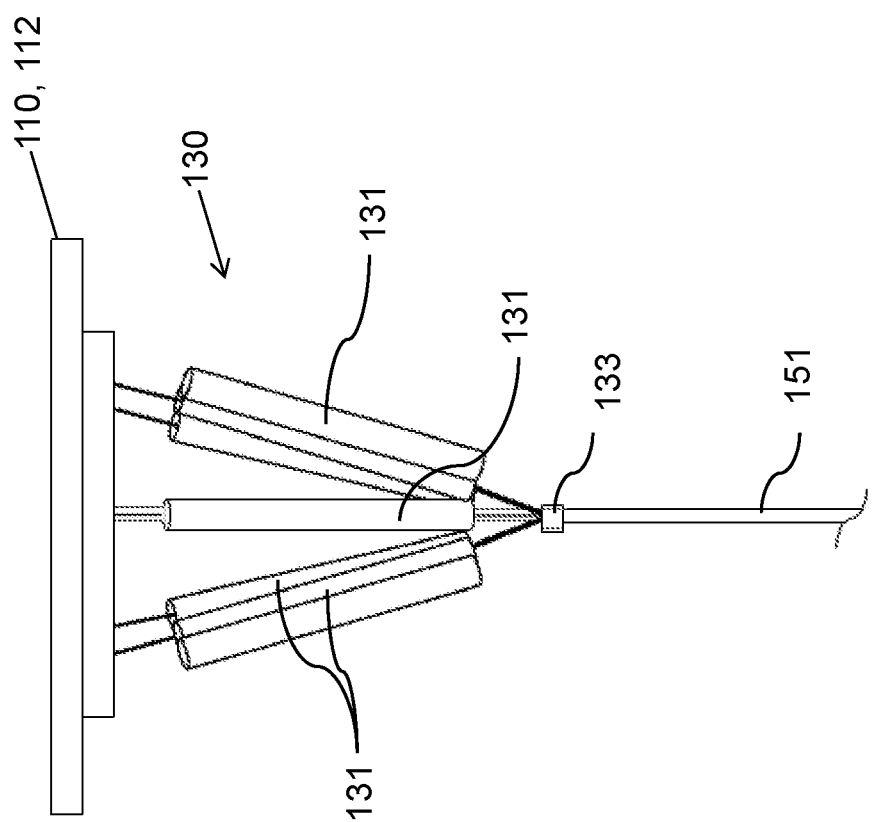
FIG. 6 is an enlarged schematic view of the tensioning system of FIG. 1.

As best shown in FIG. 6, top tensioner 130 couples central tendon 151 to platform 110 and applies tension to tendon 151. In this embodiment, top tensioner 130 includes a plurality of uniformly circumferentially-spaced tensioner links 131 uniformly circumferentially-spaced about conduit 151 proximal upper end 151a. Each tensioner link 131 has an upper end fixably attached to topside 112 and a lower end fixably attached to a tensioner ring 133 disposed about tendon 151 and fixably secured thereto. In this embodiment, each tensioner link 131 includes a hydraulic cylinder to controllably adjust the tension applied to tendon 151 by that particular link 131. Thus, tensioner 130 physically supports tendon 151 by applying tension to the upper end 151a of tendon 151 via links 131. The amount of tension applied to tendon 151 can be adjusted and controlled via the hydraulic cylinders provided along links 131.

During offshore operations, platform 110 may experience heave (vertical movement) relative to system 150. Top tensioner 130 and jumpers 121, 122 allow for and accommodate such relative movement to avoid over straining conduits 160 and tendon 151.

Referring again to FIG. 1, during offshore operations, the relatively hot process fluid 114 enters heat exchanger 113 to be cooled. Relatively cold coolant 115 is supplied to heat exchanger 113 via tendon 151 and corresponding jumper 122. Thermal energy is transferred from the relatively hot process fluid 114 to the relatively cold coolant 115 within heat exchanger 113, thereby reducing the temperature of process fluid 114 and increasing the temperature of coolant 115. The cooled process fluid 114 exiting heat exchanger 113 can be used in one or more offshore operations, and then recirculated to heat exchanger 113 to be cooled again. The relatively hot coolant 115 exiting heat exchanger 113 flows through jumpers 121 and into outer conduits 160 at upper ends 160a. Thus, upper ends 160a may also be referred to as "inlets." The coolant 115 flows from upper ends 160a to lower ends 160b and terminal block 181, and is cooled by the surrounding sea 11. In particular, thermal energy is transferred from the relatively hot coolant 115 to the relatively cool sea 11 via conduits 160. In general, the temperature of the sea 11 decreases as depth from the surface 10 increases, and thus, by flowing coolant 115 to terminal block 181 proximal seabed 15, the coolant 115 can be cooled by the coldest region of the sea 11. Within terminal block 181, the coolant 115 flows from lower ends 160b of conduits 160 into lower end 151b of tendon 151. Accordingly, lower ends 160b may also be referred to as "outlets," and the lower end 151b of tendon 151 may also be referred to as an "inlet." Next, the coolant 115 flows through tendon 151 from lower end 151b and terminal block 181 to upper end 151a. The coolant 115 may continue to transfer thermal energy to the surrounding sea 11 (e.g., be cooled) as it flows upward through tendon 151. The relatively cold coolant 115 exits upper end 151a of tendon 151 and flows through jumper 122 into heat exchanger 113. Thus, upper end 151a of tendon 151 may also be referred to as an "outlet." This process continues to continuously cool the process fluid 114. The circulation of the coolant 115 through system 150 is facilitated by one or more pumps (not shown) disposed on topsides 112 of platform 110.

The temperature of the sea 11 generally increases as depth from the surface 11 decreases. Accordingly, one or more portions of tendon 151 may be provided with insulation to reduce and/or prevent the transfer of thermal energy from the sea 11 to coolant 115 in tendon 151. The temperature of sea 11 is greatest at the surface 10, and thus, insulation may be particularly beneficial along the upper portion of tendon 151. The insulation may comprise a polymeric coating.

Figure 7:
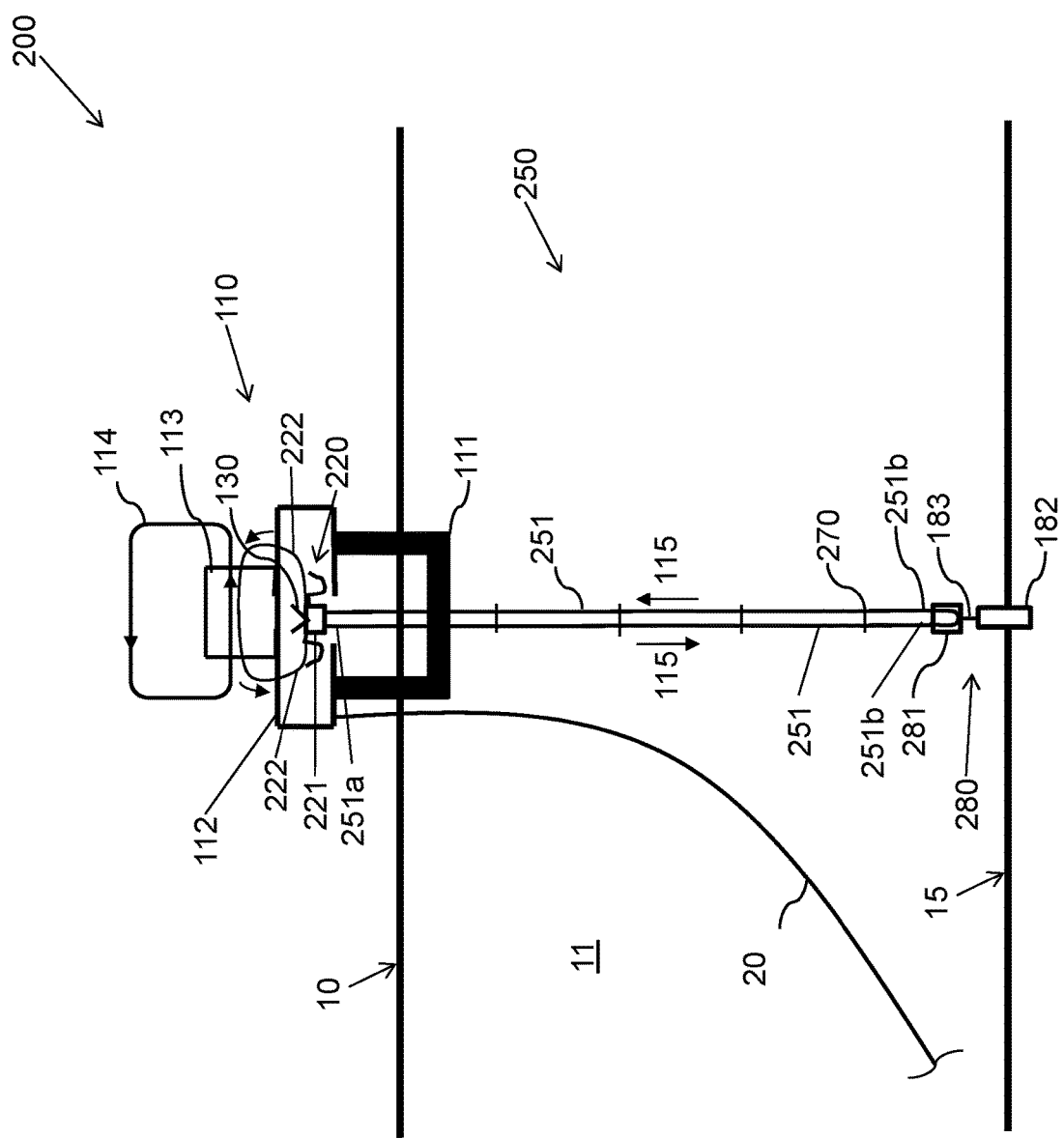
FIG. 7 is a schematic view of an embodiment of an offshore production system in accordance with principles disclosed herein.

Referring now to FIG. 7, another embodiment of an offshore production system 200 is shown. Similar to system 100, in this embodiment, system 200 produces hydrocarbons (e.g., oil and/or gas) from a subterranean formation disposed beneath seabed 15. Production system 200 includes a floating offshore platform 110 disposed at a surface or waterline 10 of the sea 11, a heat exchanger 113, and a closed-loop cooling fluid circulation system 250. Platform 110 and heat exchanger 113 are as previously described. A production riser 20 as previously described supplies production fluids to platform 110. Heat exchanger 113 is supported on the topsides 112 of platform 110, and cooling fluid circulation system 250 extends from the heat exchanger 113 to the seabed 15. Heat exchanger 113 transfers thermal energy from a process fluid 114 used in operations on topsides 112 to a cooling fluid or coolant 115 circulated through system 250. As will be described in more detail below, the coolant 115 receives thermal energy from the process fluid 114 at heat exchanger 113, and transfers thermal energy to the surrounding sea 11 with system 250.

In this embodiment, closed-loop cooling fluid circulation system 250 includes a pair of conduits 251, a first or upper connection system 220 coupling conduits 251 to platform 110, and a second or lower connection system 280 coupling conduits 251 to the seabed 15. Each conduit 251 is substantially the same as tendon 151 previously described. In particular, each conduit 251 has a first or upper end 251a coupled to topsides 112 with upper connection system 220 and a second or lower end 251b coupled to seabed 15 with lower connection system 280. As will be described in more detail below, a top tensioner 130 as previously described applies tension to each conduit 251. Accordingly, each conduit 251 may also be referred to herein as a "tendon" or "top tensioned riser."

Tendons 251 are oriented parallel to each other and are laterally spaced. The positioning and spacing of tendons 251 is maintained by a plurality of vertically-spaced guides or hubs 270. Each hub 270 is substantially the same as hubs 170 previously described. In particular, each hub 270 is a plate including holes sized to receive tendons 251. In addition, each hub 170 is fixably attached to each conduit 251 that passes therethrough (e.g., by welding, threaded connection, etc.). In this embodiment, each tendon 251 is generally supported and placed in tension by top tensioner 130.

As will be described in more detail below, one tendon 251 flows the relatively hot cooling fluid 115 exiting heat exchanger 113 from platform 110 to its lower end 251b at or proximal the seabed 15 and the other tendon flows the relatively cool cooling fluid 115 from its lower end 251b to platform 110. For purposes of clarity and further explanation, the tendon 251 that flows coolant 115 from platform 110 to the seabed 15 may also be referred to as first conduit 251 and the tendon 251 that flows coolant 115 from the seabed 15 to platform 110 may also be referred to as second conduit 251. Thus, the relatively hot cooling fluid 115 exiting heat exchanger 113 flows down first conduit 251 to its lower end 251b, from lower end 251b of first conduit 251 into lower end of second conduit 251, and then second conduit 251 flows the relatively cold cooling fluid 115 from its lower end 251b to platform 110 where it is supplied to heat exchanger 113.

Referring still to FIG. 7, upper connection system 220 includes a terminal block 221, a plurality of jumpers 222, and top tensioner 130. Upper ends 251a pass through terminal block 221 and are fixably secured thereto. Each jumper 222 extends from heat exchanger 113 to upper end 251a of one of the tendons 251. Thus, jumpers 222 provide fluid communication between heat exchanger 113 and tendons 251. Top tensioner 130 couples terminal block 221 to platform 110 and applies tension to tendons 251 via terminal block 221.

Lower connection system 280 includes a terminal block 281, an anchor 182, and a flexible joint 183 extending from block 281 to anchor 182. Anchor 182 and joint 183 are as previously described. Lower ends 251b are fixably secured to terminal block 281. In addition, terminal block 281 includes a U-shaped flow passages extending between lower ends 251b. Thus, terminal block 281 mechanically couples lower ends 251b and provides fluid communication between lower ends 251b.

Referring still to FIG. 7, during offshore operations, the relatively hot process fluid 114 enters heat exchanger 113 to be cooled. Relatively cold coolant 115 is supplied to heat exchanger 113 via second tendon 251 and corresponding jumper 222. Thermal energy is transferred from the relatively hot process fluid 114 to the relatively cold coolant 115 within heat exchanger 113, thereby reducing the temperature of process fluid 114 and increasing the temperature of coolant 115. The cooled process fluid 114 exiting heat exchanger 113 can be used in one or more offshore operations, and then recirculated to heat exchanger 113 to be cooled again. The relatively hot coolant 115 exiting heat exchanger 113 flows through one jumper 221 into first tendon 251 at upper end 251. Thus, upper end 251a of first tendon 251 may also be referred to as an "intlet." The coolant 115 flows from upper end 251a of first tendon 251 to lower end 251b of first tendon 251 and terminal block 281, and is cooled by the surrounding sea 11. Thermal energy is transferred from the relatively hot coolant 115 to the relatively cool sea 11 via first tendon 251 in the same manner as previously described with respect to conduits 160. Within terminal block 281, the coolant 115 flows from lower end 251b of first tendon 251 into lower end 251b of second tendon 251. Accordingly, lower end 251b of first tendon 251 may be referred to as an "outlet," and lower end 251b of second tendon 251 may be referred to as an "inlet." Next, the coolant 115 flows through second tendon 251 from its lower end 251b and terminal block 281 to its upper end 251a. The coolant 115 may continue to transfer thermal energy to the surrounding sea 11 (e.g., be cooled) as it flows upward through second tendon 251. The relatively cold coolant 115 exits upper end 251a of second tendon 251 and flows through the corresponding jumper 222 into heat exchanger 113. Thus, upper end 251a of second tendon 251 may also be referred to as an "outlet." This process continues to continuously cool the process fluid 114. The circulation of the coolant 115 through system 250 is facilitated by one or more pumps (not shown) disposed on topsides 112 of platform 110. For the same reasons as previously described, one or more portions of second tendon 251 may be provided with insulation to reduce and/or prevent the transfer of thermal energy from the sea 11 to coolant 115 in second tendon 251.

Figure 8:
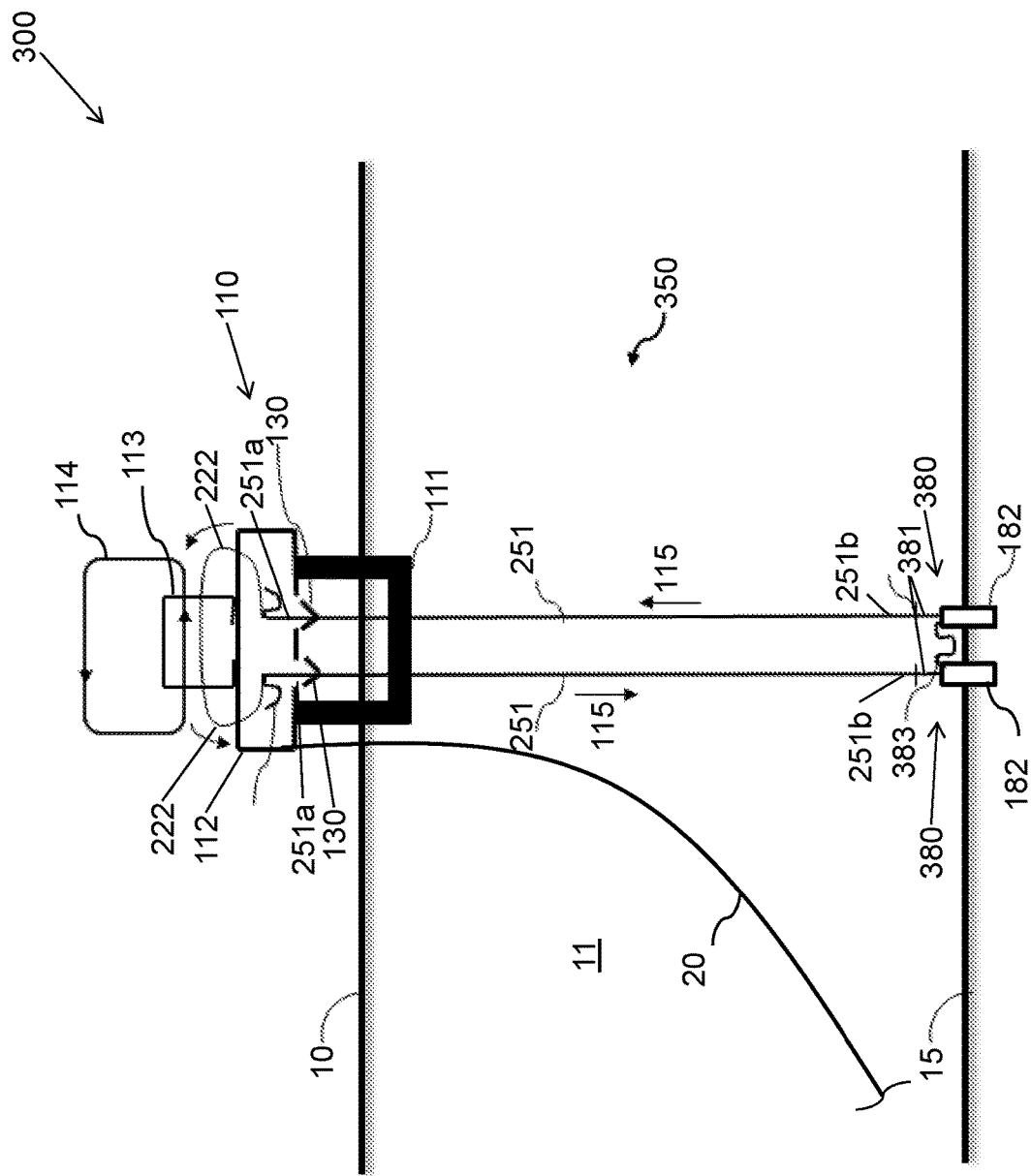
FIG. 8 is schematic view of an embodiment of an offshore production system in accordance with principles disclosed herein.

Referring now to FIG. 8, another embodiment of an offshore production system 300 is shown. Similar to systems 100, 200, in this embodiment, system 300 produces hydrocarbons (e.g., oil and/or gas) from a subterranean formation disposed beneath seabed 15. Production system 300 includes a floating offshore platform 110 disposed at a surface or waterline 10 of the sea 11, a heat exchanger 113, and a closed-loop cooling fluid circulation system 350. Platform 110 and heat exchanger 113 are as previously described. A production riser 20, as previously described, supplies production fluids to platform 110. Heat exchanger 113 is supported on the topsides 112 of platform 110, and cooling fluid circulation system 350 extends from the heat exchanger 113 to the seabed 15. Heat exchanger 113 transfers thermal energy from a process fluid 114 used in operations on topsides 112 to a cooling fluid or coolant 115 circulated through system 350. As will be described in more detail below, the coolant 115 receives thermal energy from the process fluid 114 at heat exchanger 113, and transfers thermal energy to the surrounding sea 11 with system 350.

In this embodiment, closed-loop cooling fluid circulation system 350 includes a pair of conduits or tendons 251, a pair of first or upper connection systems 320 coupling conduits 251 to platform 110, and a pair of second or lower connection system 380 coupling conduits 251 to the seabed 15. Each tendon 251 is as previously described. Upper end 251a of each tendon 251 is coupled to topsides 112 with a corresponding upper connection system 320 and lower end 251b of each tendon 251 is coupled to seabed 15 with a corresponding lower connection system 380. As will be described in more detail below, a top tensioner 130 as previously described applies tension to each tendon 251. Tendons 251 are oriented parallel to each other and are laterally spaced. In this embodiment, tendons 251 are not coupled with any guides or hubs (e.g., hubs 271).

As will be described in more detail below, one tendon 251 flows the relatively hot cooling fluid 115 exiting heat exchanger 113 from platform 110 to its lower end 251b at or proximal the seabed 15 and the other tendon flows the relatively cool cooling fluid 115 from its lower end 251b to platform 110. For purposes of clarity and further explanation, the tendon 251 that flows coolant 115 from platform 110 to the seabed 15 may also be referred to as first conduit 251 and the tendon 251 that flows coolant 115 from the seabed 15 to platform 110 may also be referred to as second conduit 251. Thus, the relatively hot cooling fluid 115 exiting heat exchanger 113 flows down first conduit 251 to its lower end 251b, from lower end 251b of first conduit 251 into lower end of second conduit 251, and then second conduit 251 flows the relatively cold cooling fluid 115 from its lower end 251b to platform 110 where it is supplied to heat exchanger 113.

Referring still to FIG. 8, upper connection system 320 includes a pair of jumpers 222 and a pair of top tensioners 130. Each jumper 222 extends from heat exchanger 113 to upper end 251a of one of the tendons 251. Thus, jumpers 222 provide fluid communication between heat exchanger 113 and tendons 251. Upper end 251a of each tendon 251 is coupled to platform 110 with one top tensioner 130, which applies tension to the corresponding tendon 251.

Lower connection system 380 includes a pair of tubular flexible joints 381, a pair of anchors 182, and a jumper 383. Each anchor 182 is as previously described. One tubular flex joint 381 couples lower end 251b of each tendon 251 to one of the anchors 182. Jumper 383 extends between flex joints 381 and provides fluid communication between tendons 251 via flex joints 381. Thus, flex joints 381 mechanically couple lower ends 251b to anchors 182 and provides fluid communication between lower ends 251b via jumper 381. In this embodiment, each joint 383 is a flex joint, however, in other embodiments, joint 383 can be a stress joint.

Referring still to FIG. 8, during offshore operations, the relatively hot process fluid 114 enters heat exchanger 113 to be cooled. Relatively cold coolant 115 is supplied to heat exchanger 113 via second tendon 251 and corresponding jumper 222. Thermal energy is transferred from the relatively hot process fluid 114 to the relatively cold coolant 115 within heat exchanger 113, thereby reducing the temperature of process fluid 114 and increasing the temperature of coolant 115. The cooled process fluid 114 exiting heat exchanger 113 can be used in one or more offshore operations, and then recirculated to heat exchanger 113 to be cooled again. The relatively hot coolant 115 exiting heat exchanger 113 flows through one jumper 222 into first tendon 251. The coolant 115 flows from upper end 251a of first tendon 251 to lower end 251b of first tendon 251 and is cooled by the surrounding sea 11. Thermal energy is transferred from the relatively hot coolant 115 to the relatively cool sea 11 via first tendon 251 in the same manner as previously described with respect to conduits 160. The coolant 115 flows from lower end 251b of first tendon 251 through the corresponding joint 383, jumper 383, and the other joint 383 into lower end 251b of the second tendon 251. Next, the coolant 115 flows through second tendon 251 from its lower end 251b to its upper end 251a. The coolant 115 may continue to transfer thermal energy to the surrounding sea 11 (e.g., be cooled) as it flows upward through second tendon 251. The relatively cold coolant 115 exits upper end 251a of second tendon 251 and flows through the corresponding jumper 222 into heat exchanger 113. This process continues to continuously cool the process fluid 114. The circulation of the coolant 115 through system 350 is facilitated by one or more pumps (not shown) disposed on topsides 112 of platform 110. For the same reasons as previously described, one or more portions of second tendon 251 may be provided with insulation to reduce and/or prevent the transfer of thermal energy from the sea 11 to coolant 115 in second tendon 251.

Figure 9:
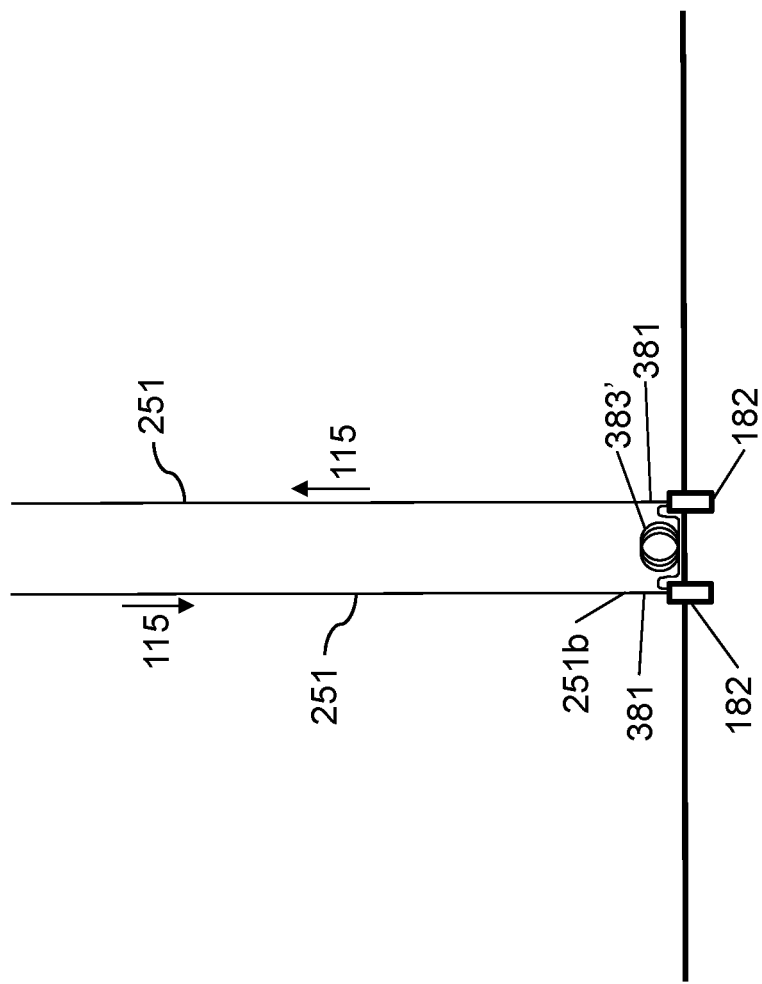
FIG. 9 is a partial schematic view of an embodiment of an offshore production system in accordance with principles disclosed herein.

In the embodiment shown in FIG. 8, jumper 383 extends between flex joints 381 and provides fluid communication between tendons 251 via flex joints 381. In addition, jumper 383 is curved and generally U-shaped. Specifically, jumper 383 curves downward between flex joints 381. The curvature of jumper 383 introduces slack in jumper 383 that allows jumper 383 to accommodate relative movement between flex joints 381 without breaking or being otherwise damaged. In other embodiments, the jumper between the flex joints (e.g., jumper 383 between flex joints 381) may have a geometry other than U-shaped. For example, in FIG. 9, a jumper 383' that can be used in place of jumper 383 in system 300 is shown. Similar to jumper 383, jumper 383' extends between flex joints 381 and provides fluid communication between tendons 251 via flex joints 381. However, in this embodiment, jumper 383' includes a plurality of circular loops between flex joints 281. The loops in jumper 383' introduces slack that allows jumper 383' to accommodate relative movement between flex joints 381 without breaking or being otherwise damaged. In addition, the loops in jumper 383' add length and surface area to jumper 383' to enhance the transfer of thermal energy of coolant 115 with the surrounding sea 11. It should be appreciated that jumper 383' is positioned at or proximal the seabed 15, which is the location in the sea 11 where the temperature is lowest. In general, the number of loops in jumper 383' and the diameter of the loops in jumper 383' can be varied and adjusted to achieve the desired transfer of thermal energy between coolant 115 and the surrounding sea 11. Inclusion of jumper 383' with loops may be particular advantageous in applications where the temperate reduction of the coolant 115 via the tendons 251 alone is insufficient such as in water depths less than 500 m.

In the embodiments of cooling systems 150, 250, 350 described herein, the coolant 115 receives thermal energy from the process fluid 114 via heat exchanger 113. However, it should be appreciated that in other embodiments, an intermediate closed loop cooling circuit may be provided between the coolant (e.g., coolant 115) and the process fluid (e.g., process fluid 114).

Figure 10:
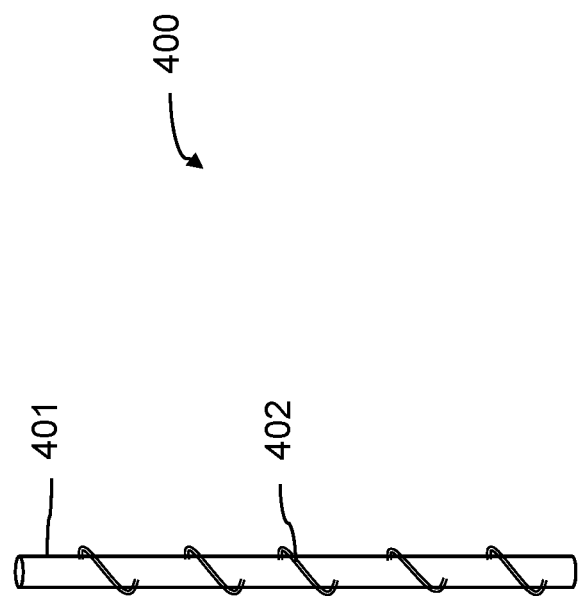
FIG. 10 is an enlarged partial schematic view of an embodiment of a conduit in accordance with principles described herein.

As previously described, coolant 115 flowing through conduits 160 and tendons 151, 251 is cooled by the surrounding sea 11 as it flows from the surface 10 to the seabed 15 and from the seabed 15 back to the surface 10. To enhance the transfer of thermal energy between coolant 115 and the surrounding sea 11, the outer surface area of conduits 160 and tendons 151, 251 may be increased by employing annular fins or helical fins along the outside of conduits 160 and tendons 151, 251. For example, referring now to FIG. 10, an embodiment of a conduit 400 that may be used for any one or more of conduits 160, tendons 151, and tendons 251 is shown. In this embodiment, conduit 400 includes a tubular or pipe 401 and a fin 402 extending helically about the outer surface of tubular 401. Pipe 401 and fin 402 mounted thereto are made of metal to enhance the heat transfer coefficient. Helical fin 402 increases the surface area of conduit 400, thereby enhancing heat transfer between conduit 400 and the surrounding sea 11. In addition, the helical geometry of fin 402 can function similar to a strake, thereby reducing induced vibrations in conduit 401 from lateral sea currents. In general, the helical angle of fin 402, the thickness of fin 402, the width of fin 402, and the length of fin 402 extends along tubular 401 can be varied as desired to achieve the preferred heat transfer coefficient.

Figure 11:
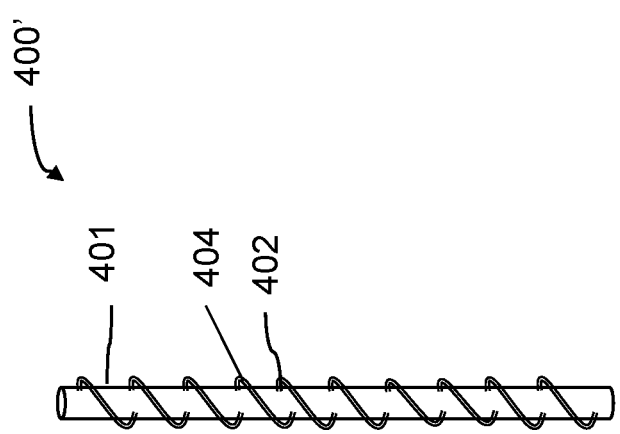
FIG. 11 is an enlarged partial schematic view of an embodiment of a conduit in accordance with principles described herein.
Figure 12:
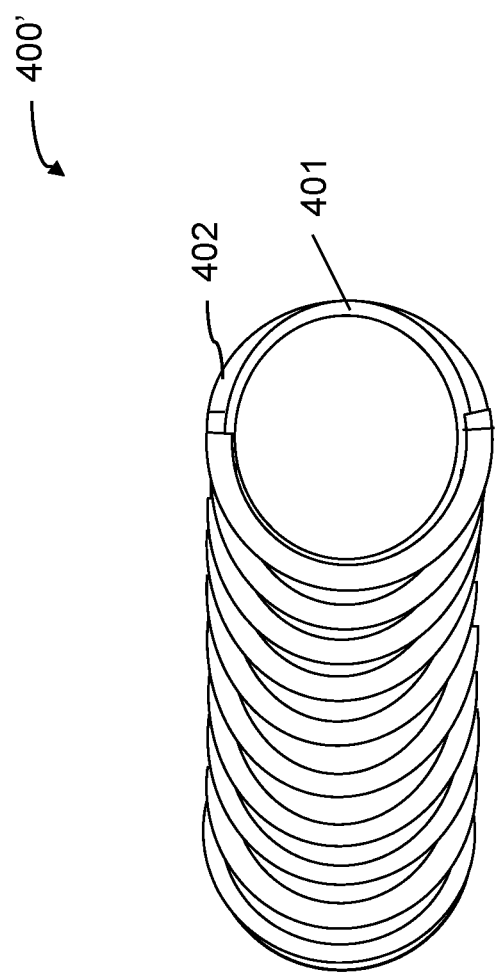
FIG. 12 is an enlarged schematic side view of the conduit of FIG. 11.

Referring now to FIGS. 11 and 12, another embodiment of a conduit 400' that may be used for any one or more of conduits 160, tendons 151, and tendons 251 is shown. Conduit 400' is substantially the same as conduit 400 previously described. In particular, conduit 400' includes tubular 401 and helical fin 402 mounted to pipe 401. However, in this embodiment, conduit 400' includes a second helical fin 403 mounted to pipe 401. Helical fin 403 is oriented parallel to helical fin 402, but is axially spaced therefrom.

In general, the helical angle of each fin 402, 403, the thickness of each fin 402, 403, the width of each fin 402, 403, and the length of each fin 402, 403 extends along tubular 401 can be varied as desired to achieve the preferred heat transfer coefficient.

Figure 13:
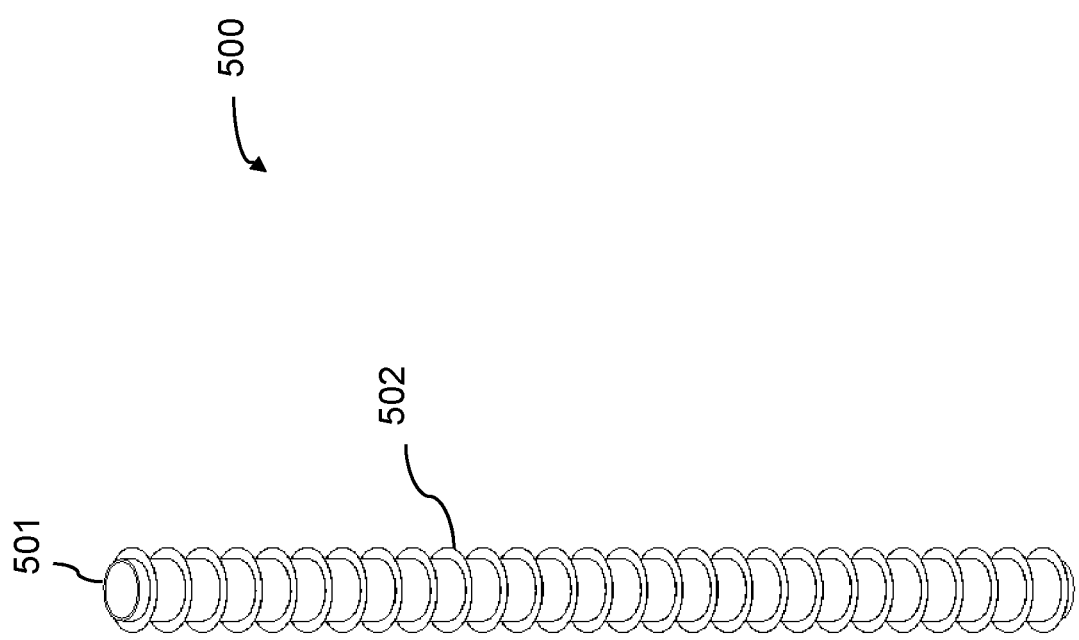
FIG. 13 is an enlarged partial schematic view of an embodiment of a conduit in accordance with principles described herein.
Figure 14:
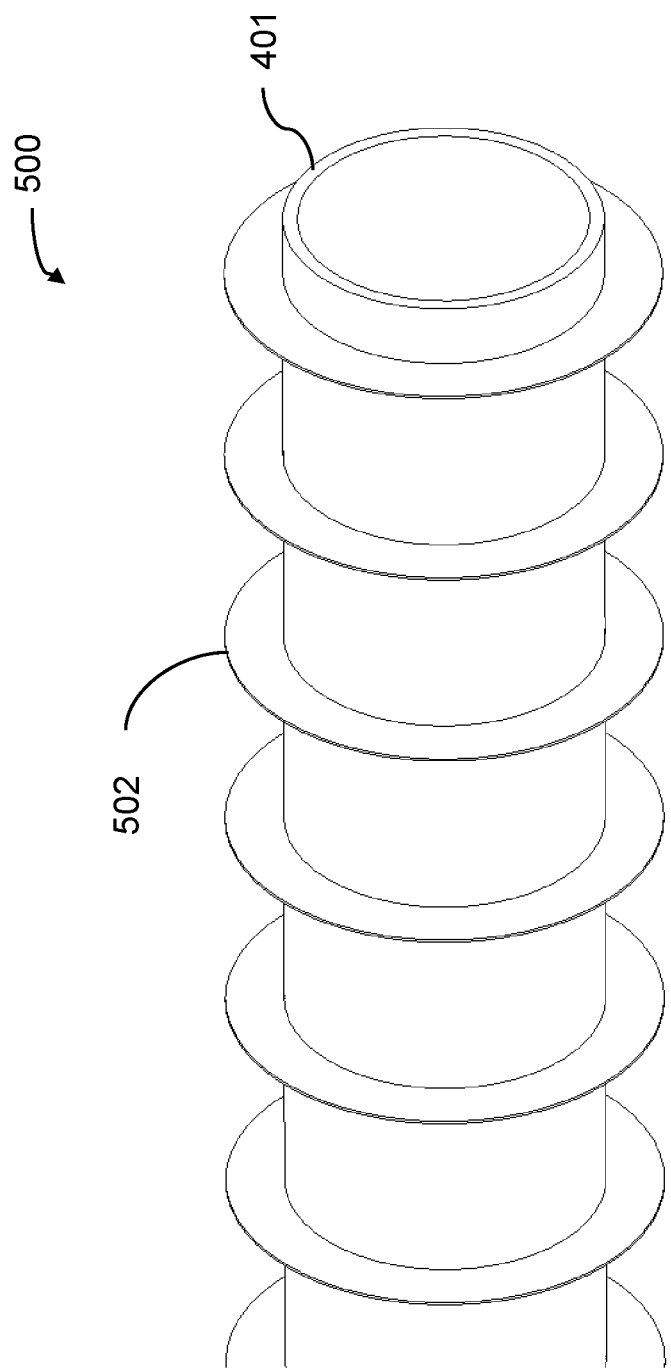
FIG. 14 is an enlarged perspective side view of the conduit of FIG. 13.

Referring now to FIGS. 13 and 14, another embodiment of a conduit 500 that may be used for any one or more of conduits 160, tendons 151, and tendons 251 is shown. In this embodiment, conduit 500 includes a tubular or pipe 401 and a plurality of spaced annular fins 502 extending radially outward from tubular 401. Pipe 401 and fins 502 mounted thereto are made of metal to enhance the heat transfer coefficient. Each fin 502 increases the surface area of conduit 400, thereby enhancing heat transfer between conduit 400 and the surrounding sea 11. In general, the thickness of each fin 502, the width of each fin 502, the distance between each pair of adjacent fins 503, and the length of tubular 401 along which fins 502 are disposed can be varied as desired to achieve the preferred heat transfer coefficient.

While preferred embodiments have been shown and described, modifications thereof can be made by one skilled in the art without departing from the scope or teachings herein. The embodiments described herein are exemplary only and are not limiting. Many variations and modifications of the systems, apparatus, and processes described herein are possible and are within the scope of the disclosure. For example, the relative dimensions of various parts, the materials from which the various parts are made, and other parameters can be varied. Accordingly, the scope of protection is not limited to the embodiments described herein, but is only limited by the claims that follow, the scope of which shall include all equivalents of the subject matter of the claims. Unless expressly stated otherwise, the steps in a method claim may be performed in any order. The recitation of identifiers such as (a), (b), (c) or (1), (2), (3) before steps in a method claim are not intended to and do not specify a particular order to the steps, but rather are used to simplify subsequent reference to such steps.

What is claimed is:

1. An offshore production system, comprising:
   a surface vessel; and
   a closed-loop cooling fluid circulation system extending subsea from the surface vessel and configured to cool a cooling fluid, wherein the closed-loop cooling fluid circulation system comprises:
      a first tendon having an upper end coupled to the surface vessel and a lower end coupled to the seabed, wherein the first tendon is in tension between the upper end and the lower end; and
      a plurality of circumferentially-spaced conduits disposed about the first tendon, wherein each conduit has an upper end coupled to the surface vessel and a lower end coupled to the seabed, wherein the lower end of each conduit is in fluid communication with the lower end of the first tendon;
      wherein the first tendon is configured to flow the cooling fluid from the lower end of the first tendon to the upper end of the first tendon;
      wherein each of the conduits is configured to flow the cooling fluid from the upper end of the conduit to the lower end of the conduit.

2. The offshore production system of claim 1, wherein each conduit is coupled to the tendon with a plurality of axially spaced hubs.

3. The offshore production system of claim 1, wherein the first tendon has an inner diameter that is larger than an inner diameter of each of the conduits.

4. The offshore production system of claim 1, wherein the plurality of conduits are uniformly circumferentially-spaced about the first tendon.

5. The offshore production system of claim 1, wherein the first tendon is tensioned with a top tensioner.

6. The offshore production system of claim 1, wherein the first tendon comprises a plurality of axially spaced annular fins or a helical fin.

7. The offshore production system of claim 1, wherein each conduit comprises a plurality of axially spaced annular fins or a helical fin.

8. A system for circulating and cooling a cooling fluid for receiving thermal energy from a process fluid, the system comprising:
   a tendon extending subsea from an offshore vessel, the tendon having an upper end coupled to the offshore vessel and a lower end coupled to the seabed;
   a plurality of circumferentially-spaced conduits disposed about the tendon, wherein each conduit extends subsea from the offshore vessel, and wherein each conduit has an upper end coupled to the offshore vessel and a lower end coupled to the seabed, wherein the lower end of each conduit is in fluid communication with the lower end of the tendon; and
   a plurality of vertically spaced hubs coupling the conduits to the tendon, wherein the hubs are configured to maintain a radial spacing between the tendon and the conduits;
   wherein the conduits are configured to flow the cooling fluid from the offshore vessel and the tendon is configured to flow the cooling fluid to the offshore vessel.

9. The system of claim 8, further comprising a heat exchanger disposed on the offshore vessel, wherein the heat exchanger has a first inlet in fluid communication with the upper end of the tendon, a first outlet in fluid communication with the upper ends of the conduits, and a first passage extending from the first inlet to the first outlet.

10. The system of claim 8, further comprising a top tensioner coupling the upper end of the tendon to the offshore vessel.

11. The system of claim 8, further comprising a plurality of axially spaced annular fins or a helical fin disposed along the outer surface of each conduit.

12. A method for cooling a process fluid on an offshore vessel, the method comprising:
   (a) flowing a cooling fluid from a heat exchanger on the offshore vessel down a plurality of conduits extending subsea from the vessel, wherein each conduit has an upper end coupled to the offshore vessel and a lower end proximal the seabed:
   (b) flowing the cooling fluid from the lower ends of the conduits into a lower end of a tendon, wherein the lower end of the tendon is proximal the seabed and an upper end of the tendon is coupled to the offshore vessel, wherein the plurality of conduits are circumferentially-spaced about the tendon;
   (c) applying tension to the tendon during (a) and (b); and
   (d) transferring thermal energy from the cooling fluid to the surrounding water during (a) and b).

13. The method of claim 12, further comprising:
   (e) flowing a process fluid through a first passage in a heat exchanger on the offshore vessel;
   (f) flowing the cooling fluid from the upper end of the tendon through a second passage in the heat exchanger;
   (g) transferring thermal energy from the process fluid to the cooling fluid during (e) and (f); and
   (h) flowing the cooling fluid from the heat exchanger into the upper ends of the conduits.

14. The method of claim 12, further comprising transferring thermal energy from the conduits to the surrounding water during (d) with a plurality of axially spaced fins or a helical fin disposed along an outer surface of each conduit.

15. The method of claim 12, further comprising:
   (i) coupling the conduits to the tendon with a plurality of vertically spaced hubs; and
   (j) maintaining the spacing of the conduits and the tendon with the hubs.

* * * * *